Patented Dec. 13, 1949

2,490,764

UNITED STATES PATENT OFFICE 2,490,764

FLUORINATED ORGANIC COMPOUNDS

Anthony F. Benning, Woodstown, N. J., and Joseph Dal Park, Wilmington, Del., assignors to Kinetic Chemicals, Inc., Wilmington, Del., a corporation of Delaware No Drawing. Original application July 4, 1945, Serial No. 603,258. Divided and this application September 4, 1946, Serial No. 694,818

7 Claims. (Cl. 260—653)

This invention relates to a novel process of preparing highly fluorinated organic compounds and to new products obtained thereby.

It is well known that many chlorine-containing aliphatic compounds may be treated with various fluorinating agents to replace part of the chlorine by fluorine. It is also well known that the more chlorine atoms there are on a carbon atom, the more easily some of them are replaced by fluorine and conversely, that it is extremely difficult, if not impossible, to replace chlorine attached to a carbon containing 2 or more fluorine atoms. For example, when $CCl_4$ is treated with the conventional type of fluorination catalyst, such as a catalyst obtained by passing HF into a mixture of $SbCl_3$ and $SbCl_5$ until the mixture contains about 4 to 8% fluorine, the first and second fluorine atoms are readily introduced. However, $CClF_3$ is obtained only with considerable difficulty and $CF_4$ cannot be obtained at all. Likewise, in the higher homologous series, $CF_3$ groups have not been formed heretofore by substitution of chlorine with fluorine. A chlorine atom, on a carbon carrying 2 fluorine atoms and attached to another carbon atom, is very unreactive and cannot be replaced by fluorine, employing the ordinary type of fluorination catalyst under the conditions ordinarily employed for fluorination.

It is an object of our invention to provide an improved process for producing highly fluorinated aliphatic compounds. Another object is to provide a novel method for producing compounds of the formula $A—CF_2—(CF_2)_n—CF_3$ wherein $n$ is an integer of at least 1 and A represent a member of the group of H, Cl and F. A further object is to produce novel compounds of the formula $A—CF_2—(CF_2)_n—CF_3$ wherein $n$ is an integer of from 1 to 12 and A represents a member of the group consisting of H and Cl. Other objects are to provide new compositions of matter and to advance the art. Still other objects will appear hereinafter.

The above and other objects may be accomplished in accordance with our invention which comprises mixing an organic compound of the formula $A—CF_2—(CF_2)_n—CF_2—B$, wherein $n$ is an integer of at least 1, A is a member of the group consisting of H and Cl and B is a member of the group consisting of Cl and F, with substantially pure $SbF_5$ and heating the mixture in a closed vessel at temperatures of from about 175° C. to about 350° C. and preferably from 175° C. to about 250° C. until at least one of A and B is replaced by fluorine. By this process, we are able to readily and economically produce compounds of the formula

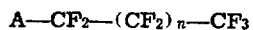

wherein $n$ is an integer of at least 1 and A represents a member of the group consisting of H, Cl and F. Of these, the compounds, in which A represents one of H and Cl, are new chemical compounds having novel and unexpected valuable properties. Also, those compounds in which A represents F and $n$ represents an integer of at least 5, are new and valuable compounds which could not be made by any method known in the art.

The compounds of the formula

are normal open-chain compounds with the members A and B attached to the terminal carbon atoms at opposite ends of the chain. Likewise, the compounds of the formula

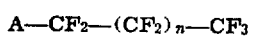

are normal open-chain compounds with A being bonded directly to a terminal carbon atom.

Prior to our invention, no method was known to the art for replacing either A or B, in compounds of the formula $A—CF_2—(CF_2)_n—CF_2—B$, with fluorine, and the ordinary fluorinating agents are ineffective for such purposes. However, we have found that, if such compounds are mixed with substantially pure $SbF_5$ and heated in a closed vessel at temperatures of from about 175° C. to about 350° C., the chlorine atoms can be replaced by fluorine.

Ordinarily, the $SbF_5$ employed will have a purity of about 98% or higher with the principal impurity being chlorine. In order to be active, the antimony in the fluorinating agent must be in pentavalent form and the agent must contain at least 22.8% of F by weight. The $SbF_5$ should be free of other metals, such as iron and copper, which are anti-catalytic. When the reaction involves the replacement of Cl by F, the Cl replaces F in the $SbF_5$ forming chloro-fluorides of antimony. Accordingly, it will generally be undesirable to start the process with $SbF_5$ containing substantial amounts, greater than 10%, of $SbF_3$ or of chlorofluorides of antimony. Accordingly, the "substantially pure $SbF_5$" contains not more than 10% of $SbF_3$ or chloro-fluorides of antimony and not more than about 2% of other impurities.

The reaction is carried out in a closed vessel which maintains the reactants in contact for the necessary period of heating. Also thereby, the reaction is carried out under pressure, the autogenous pressures developed at the temperatures employed.

In order to more clearly illustrate our invention, the preferred modes of carrying the same into effect and the advantageous results to be obtained thereby, the following examples are given in which the parts are by weight, except where otherwise specifically indicated:

EXAMPLE I

About 150 parts of substantially pure $SbF_5$ was added to a nickel autoclave bomb and cooled to carbon-ice temperature. 95 parts of $H(CF_2)_4Cl$ (B. P. 49–50° C) was added, the bomb tightly closed and then heated in an oil bath at 175° C. for about three hours with agitation. After completion of the heating cycle, the bomb and its contents were cooled to room temperature, the bomb cap removed, and the contents poured into crushed ice. After washing free of antimony salts with dilute HCl (about 18%), the organic material was washed free of acid, dried over calcium chloride, and fractionally distilled in a laboratory precision column (½" x 5') packed with ¼" glass helices. About 54 parts of the dried crude material yielded practically all $H(CF_2)_4F$. This material had a boiling range of 13 to 15° C. and a molecular weight of 223 as found by the vapor density method. Molecular weight, calculated for $H(CF_2)_4F$, is 220.

EXAMPLE II

About 175 parts of substantially pure $SbF_5$ were added to a nickel autoclave bomb and the bomb then cooled to carbon-ice temperature. 65 parts of $H(CF_2)_8Cl$ (B. P. 143–144° C.) was then added, the bomb tightly closed and subjected to a temperature of 200° C. in an oil bath for about 10 hours. After cooling, the contents of the bomb were poured into crushed ice. The antimony salts were dissolved in dilute HCl and the organic layer recovered and added to the organic material in the crushed ice. This material was then further treated with dilute HCl, washed free of acid, dried over $CaCl_2$ and fractionally distilled. Over 90% of the material distilled over at 118–119° C., the remaining 10% being unchanged $H(CF_2)_8Cl$. The material boiling at 118–119° C. is $H(CF_2)_8F$ which has a density, $$D_{25}^{25}\ 1.760$$

EXAMPLE III

About 100 parts of $H(CF_2)_3Cl$ (B. P. 21° C.) was added to about 100 parts of $SbF_5$ in a bomb cooled to about −70° C. The contents of the bomb were then heated at 175° C. for 10 hours, after which time, the reaction products were vented through a valve. The effluent gases were scrubbed in dilute caustic solution, dried and condensed in a receiver cooled to carbon-ice temperature. About 70 parts of the reaction products, obtained in this manner, were fractionally distilled and two main fractions obtained. One fraction $H(CF_2)_3F$ boiled at −18° C. at 760 mm. The vapor density, measured at 28° C., was 6.76 g./l. at 741 mm. Hg pressure. Some lower boiling fractions (−40 to −18° C.) were obtained but not identified. The second fraction consisted of unchanged starting material, $H(CF_2)_3Cl$.

The other compounds of the series

$$HCF_2\text{—}(CF_2)_n\text{—}CF_3$$

were obtained by methods similar to Examples I to III. Characteristics of the products are summarized in Table I.

TABLE I
*Monosubstituted perfluoro compounds of the Series $HCF_2$—$(CF_2)_n$—$CF_3$*

| Compound | B. P., C. | $D_{25}^{25}$ | Percent F | | Mol. Wt. | |
|---|---|---|---|---|---|---|
| | | | Calc. | Found | Calc. | Found |
| $H(CF_2)_3F$ | −17 to −18 | | | | | |
| $H(CF_2)_4F$ | 14–15 | | | | 220 | 223 |
| $H(CF_2)_5F$ | 45 | 1.614 | | | 270 | 273 |
| $H(CF_2)_6F$ | 71–72 | 1.684 | 77.2 | 76.5 | 320 | 322 |
| $H(CF_2)_7F$ | 96–97 | 1.725 | | | | |
| $H(CF_2)_8F$ | 118–119 | 1.760 | 78.0 | 77.1 | | |
| $H(CF_2)_9F$ | 138–139 | 1.795 | | | | |
| $H(CF_2)_{10}F$ | 159–160 | solid | M. P. | 31–32° C | | |
| $H(CF_2)_{11}F$ | 202–204 | solid | M. P. | 72–73° C | | |

All the liquids disclosed in Table I have refractive indices below 1.30, the range below which is not covered in any standard refractometer now on the market. Using the common atomic refraction value of 1.11 for fluorine, the calculated refractive index for $H(CF_2)_5F$ was found to be 1.25 at 25° C. In a similar manner, refractive indices of the others may be calculated.

The novel compounds of the formula

$$HCF_2\text{—}(CF_2)_n\text{—}CF_3$$

have different chemical properties than the lower homologous compounds. This is shown by the fact that the hydrogen in our compounds may be replaced readily by bromine upon brominating under activation with a photoflood-lamp. On the other hand, it is known that the lower homologs, such as $HCF_3$, cannot be brominated even in sunlight (A. L. Henne, Jour. Am. Chem. Soc., 59, 1201). Thereby, the compounds of our invention have greater utility in the synthesis of other valuable organic substances.

The difference in reactivity of our novel compounds over the lower homologues is shown by the following Experiments 1 to 3:

EXPERIMENT 1

About 2.5 liters of $CF_3CHF_2$ (B. P. −48° C.) was placed in an evacuated 5 liter flask and 5 cc. of water was added along with 10 gm. of bromine. The flask was irradiated with a photoflood-lamp at a distance of about 2" for 3 hours. The temperature of the contents rose to 70° C. during the irradiation. The bromine vapors were then destroyed with sodium bisulfite and sodium hydroxide solutions and the contents of the flask were dried and condensed in a condenser cooled with carbon-ice and acetone. About 12.5 gm. of condensate was obtained. This material had a reflux boiling point of −47 to −48° C., showing that no appreciable amount of bromination had taken place.

EXPERIMENT 2

A sample of H(CF₂)₃F (B. P. −17° to −18° C.) was treated in exactly the same manner as described in Experiment 1. The product had a reflux boiling point of −10° C., and by fractional distillation a fraction boiling at 18–20° C. was isolated, corresponding to Br(CF₂)₃F.

EXPERIMENT 3

A sample of H(CF₂)₄F (B. P. 14–15° C.) was treated in exactly the same manner as described in Experiment 1. The reflux boiling point of the product was about 30° C., showing that considerable bromination had taken place.

The new compounds of the formula $$HCF_2-(CF_2)_n-CF_3$$

are also useful per se for various commercial purposes. They possess outstanding thermal stability and are useful as refrigerants (those boiling below 45° C.), inert solvents, preferential extraction solvents, reaction media and heat transfer media. Since they possess a replaceable terminal hydrogen atom, they may be utilized as intermediates for dyes, surface-active agents, foam dispersers, etc., by replacement of the hydrogen by other functional groups, such as hydroxy, ether, chlorine, bromine and the like.

EXAMPLE IV

About 90 parts of substantially pure SbF₅ were added to a nickel autoclave bomb and cooled to carbon-ice temperature with protection from moisture. 72 parts of Cl(CF₂)₆Cl (B. P. 114–115° C.) were then added, the bomb tightly closed and allowed to warm up. This bomb and its contents were then subjected to heating in an oil bath with agitation for about 10 hours at 175° C. After cooling, the contents of the bomb were poured into crushed ice, washed with dilute HCl to remove antimony salts, washed free of acid and dried over calcium chloride for two days. The dried organic material, was then subjected to fractional distillation in a laboratory precision column packed with glass helices.

The following fractions were obtained:
1. Boiling range 57 to 57.7° C. (foreshot).
2. Boiling range 57.7 to 58.5° C.
3. Boiling range 58.5 to 85° C.
4. Boiling range 85 to 85.4° C.

Fraction 2 was found to be pure C₆F₁₄ as shown by the vapor density at 70° C. and 760 mm. Hg which was found to be 12.25 g. per liter (mol. wt. found 345; calc. for C₆F₁₄, 338).

The molecular weight of fraction 4 was found to be 357 by the vapor density method as compared to 354.5 calculated for Cl(CF₂)₆F. Chlorine found was 9.3; calc. for Cl(CF₂)₆F is 10.0.

EXAMPLE V

About 100 grams of substantially pure SbF₅ were added to a nickel autoclave bomb (capacity of about 200 cc.) and cooled to carbon-ice temperature. After cooling, 103 grams of H(CF₂)₆Cl (B. P. 101° C.) were added and the bomb tightly closed. After heating in an oil bath at about 175° C. for 15 hours, the bomb was cooled and the contents poured into crushed ice. The recovered organic material, after washing and drying, amounted to 88 grams. Subjected to fractional distillation in a laboratory precision column, 93% of the organic material boiled at 71.3 to 71.5° C. with little or no trace of any lower boiling fraction. The above constant boiling fraction was identified as H(CF₂)₆F.

Thirty-five grams of the above H(CF₂)₆F was added to a previously evacuated 5-liter Pyrex flask along with about 15 cc. of water. Chlorine was admitted until the pressure was one atmosphere and the contents were subjected to heat and light from a Photoflood-lamp for about 2 to 3 hours. During this time, the flask was frequently shaken. This operation was repeated several times during which time the temperature in the flask reached a maximum of 70–80° C. The excess chlorine, remaining in the flask, was removed with bisulfite solution, the organic material removed, washed with dilute NaOH solution, then water, and dried over calcium chloride. Upon distillation, practically all of the material boiled constantly at 85–86° C. and was proved to be identical with the Cl(CF₂)₆F obtained in Example IV by boiling point, vapor density, etc.

Other members of the series $$ClCF_2-(CF_2)_n-CF_3$$

were obtained by the methods of Examples IV and V. Their properties are tabulated in Table II given below:

TABLE II
Fluorinated derivatives of the series Cl(CF₂)ₙF

| Compound | B. P., °C. | D₂₅²⁵ | Per cent F |  | Per cent Cl |  |
|---|---|---|---|---|---|---|
|  |  |  | Calc. | found | calc. | found |
| Cl(CF₂)₃F | −2 to −3 |  |  |  |  |  |
| Cl(CF₂)₄F | 29–30 | 1.610 |  |  |  |  |
| Cl(CF₂)₅F | 59–60 | 1.655 |  |  |  |  |
| Cl(CF₂)₆F | 85–86 | 1.705 | 68.7 | 68 | 11.6 | 11.3 |
| Cl(CF₂)₇F | 112–113 | 1.745 | 69.7 | 69.1 | 10 | 9.3 |
| Cl(CF₂)₈F | 132–153 | 1.778 | 68.5 | 70.6 | 8.7 | 8.6 |
| Cl(CF₂)₉F | 150–151 | 1.865 |  |  |  |  |
| Cl(CF₂)₁₀F | 169–171 | solid |  |  |  |  |
| Cl(CF₂)₁₄F | 211–212 | solid |  |  |  |  |

All the liquids among the compounds of Table II have refractive indices below 1.30 which is below the range covered in any standard refractometer.

The compounds of the formula $$ClCF_2-(CF_2)_n-CF_3$$

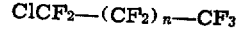

are chemically different and react differently than the lower homologous compounds. We have found that if molar proportions of such compounds of our invention are heated with SbF₅ at 175° C. in a nickel bomb for 10 hours, there is at least a 50% conversion of the compound to a completely fluorinated compound of the formula CF₃—(CF₂)ₙ—CF₃. This experiment has been carried out successfully with representative compounds wherein n equaled 1, 3, 4, 5, 6 and 11, respectively. On the other hand, when ClCF₂—CF₃ and ClCF₃ were treated in the same manner, there was little or no conversion to a completely fluorinated compound. Therefore, our compounds are useful as intermediates in forming completely fluorinated compounds for which the lower homologs are of no value.

These new compounds of the formula $$ClCF_2-(CF_2)_n-CF_3$$

are also useful per se for a variety of commercial purposes. They possess outstanding thermal stability and are useful as heat transfer media, liquid coolants, inert reaction media, etc. They are non-toxic, non-inflammable and possess boiling ranges desirable for a variety of uses in the refrigeration and heating industry. While these compounds are relatively stable, compared to corresponding chloro hydrocarbons, the terminal chlorine atom is sufficiently reactive to permit the compounds to be utilized as intermediates in the formation of dyes, surface-active agents, foam dispersers, etc.

EXAMPLE VI

About 90 parts of substantially pure $SbF_5$ were added to an autoclave bomb (fabricated of nickel) and cooled to carbon-ice temperature in a closed system. Seventy-two parts of $Cl(CF_2)_6Cl$ (B. range 113 to 114° C.) were then added and the bomb tightly closed. After heating in an oil bath for 15 hours at 175° C., the bomb was cooled to room temperature and its contents poured into crushed ice. The reaction products were washed with dilute hydrochloric acid to remove antimony salts, washed free of acid and dried over calcium chloride. The recovered organic material amounting to about 66 parts was then subjected to fractionation in a laboratory precision column packed with glass helices.

About 33 parts of the material distilled over at 57–58° C. and had a molecular weight of 340 by the vapor density method. The calculated molecular weight for $F(CF_2)_6F$ is 338. The freezing point of this same fraction was below −74° C., $$D_{25}^{25}$$

was 1.68. The remaining 33 parts distilled over at 85–86° C. and was definitely identified as $Cl(CF_2)_6F$. This latter fraction, upon further treatment as described above with $SbF_5$, yielded the perfluorinated compound $F(CF_2)_6F$. The organic recovery in this case was over 98%.

EXAMPLE VII

About 50 parts of substantially pure $SbF_5$ was added to an autoclave bomb similar to the one used in Example VI. The bomb was then cooled to carbon-ice temperature, 30 parts of $H(CF_2)_9Cl$ (boiling range 162–163° C.) were added and the bomb tightly closed. After heating the bomb at 175° C. for about 15 hours, it was cooled to room temperature and the contents poured into crushed ice. After treatment of the organic material with dilute hydrochloric acid, the product was washed free of acid and dried over "Drierite," a commercial calcium sulfate drying agent, and calcium chloride. The above material was then subjected to fractionation in a laboratory precision column packed with glass helices. A small fraction distilled over at 125–128° C. which was identified as $F(CF_2)_9F$, but the main fraction came over at 139.6 to 140.6° C. (uncorr.) which was identified as $H(CF_2)_9F$. This latter material was chlorinated to $Cl(CF_2)_9F$ in a known manner and fluorinated in a manner similar to that described in Example VI. The perfluorinated compound thus obtained, boiled at 127° C., and had a liquid density of $$D_{25}^{25}\ 1.78$$

Other members of the series up to $C_{10}$ were similarly obtained. Their properties are tabulated in Table III.

EXAMPLE VIII

About 80 parts of substantially pure $SbF_5$ were added to an autoclave bomb similar to the one used in Example VI. Thirty-five parts of $$H(CF_2)_{13}Cl$$

(B. P. 214° C.) were then added and the bomb tightly closed. The bomb was then heated to 250° C. for about 15 hours, with agitation. After cooling to room temperature, the contents were treated with dilute hydrochloric acid. The solid organic material was dissolved in 150 cc. of $H(CF_2)_4Cl$ (B. P. 49–50° C.) and subsequently treated with more dilute acid, washed free of acid and dried over $CaCl_2$. The solution was then placed in a fractionating column, the solvent removed and the reaction products distilled. Two compounds were isolated, $F(CF_2)_{13}F$ (B. P. 193–196° C.) and $H(CF_2)_{13}F$ (B. P. 202–204° C.), each constituting about 50% of the reaction product.

TABLE III

*Perfluorinated derivatives of the series* $CF_3—(CF_2)_n—CF_3$

| Compound | B. P., °C. | $D_{25}^{25}$ | M. P., °C. | Mol. Wt. Calc. | Mol. Wt. Found |
|---|---|---|---|---|---|
| $F(CF_2)_6F$ | 58 | 1.68 | <−74 | 338 | 340 |
| $F(CF_2)_7F$ | 83–84 | 1.73 | | 388 | 391 |
| $F(CF_2)_8F$ | 107 | | | | |
| $F(CF_2)_9F$ | 127 | 1.78 | | | |
| $F(CF_2)_{10}F$ | 150 | | | | |
| $F(CF_2)_{13}F$ | 193–196 | | 70–71 | | |

The novel perfluorinated compounds obtained by us are very useful compounds by virtue of their great thermal and chemical stability. These properties, coupled with their relatively high boiling points, make them liquids desirable as power fluids, heat transfer media, inert reaction media, etc. For example, the higher boiling members of our series of perfluorinated compounds are quite suitable for liquid coolants in aeroplane engines where the lower boiling members (boiling range below 50° C.) are unsuited, due to the generation of higher pressures which, in turn, require heavier and stronger cylinder blocks to withstand the greater pressures.

By our invention, we have also provided a new and economical method of producing mono substituted perfluorinated open-chain compounds wherein the substituent is hydrogen or chlorine and is always on a terminal carbon atom. By this method of preparation, the possibility of the formation of other isomers is precluded. We are thereby enabled to produce compounds of known definite structures which are useful in the production of derivatives of known definite structures. The process is particularly adaptable to the production of perfluorinated compounds which possess known definite structures and which could not be obtained by any other method known to the art.

It will be understood that the examples given heretofore have been given for illustrative purposes solely and that our invention is not to be limited to the specific embodiments included therein. On the other hand, many variations and modifications, which may be made without departing from the spirit or scope of our invention, will be readily apparent to those skilled in the art.

The compounds of the formula $$HCF_2—(CF_2)_n—CF_2Cl$$

and their preparation by pyrolyzing $CHClF_2$ at temperatures of from about 600° C. to about 1000° C. are disclosed and claimed in the application of Downing, Benning and McHarness, Ser. No. 632,116 filed November 30, 1945, as a continuation-in-part of application Ser. No. 435,064 filed February 11, 1943, now Patent No. 2,387,247.

Such compounds and the process of making them are also disclosed in Patent No. 2,384,449 to Benning et al. and Patent No. 2,384,821 to Downing et al. The compounds of the formula $ClF_2—(CF_2)_n—CF_2Cl$ and their preparation by the chlorination of compounds of the formula $HCF_2—(CF_2)_n—CF_2Cl$ in actinic light are disclosed and claimed in the application of Benning and Park, Ser. No. 548,308 filed August 5, 1944, now abandoned.

This is a division of our prior co-pending application Ser. No. 603,258 filed July 4, 1945, now abandoned.

We claim:

1. A compound of the formula $$ClCF_2—(CF_2)_n—CF_3$$

wherein $n$ is an integer of from 1 to 12.

2. The compound of the formula $$ClCF_2—CF_2—CF_3$$

3. The process which comprises mixing an organic compound of the formula $$Cl—CF_2—(CF_2)_n—CF_2—B$$

wherein $n$ is an integer of at least 1, and B is a member of the group consisting of Cl and F, with a fluorinating agent consisting of $SbF_5$, not more than 10% of $SbF_3$ and chlorofluorides of antimony and not more than 2% of chlorine and heating the mixture in a closed vessel at temperatures of from about 175° C. to about 350° C. until at least one Cl is replaced by fluorine.

4. The process which comprises mixing an organic compound of the formula $$ClCF_2—(CF_2)_n—CF_2Cl$$

wherein $n$ is an integer of at least 1, with a fluorinating agent consisting of $SbF_5$, not more than 10% of $SbF_3$ and chlorofluorides of antimony and not more than 2% of chlorine and heating the mixture in a closed vessel at temperatures of from about 175° C. to about 250° C. until at least one Cl is replaced by fluorine.

5. The process which comprises mixing an organic compound of the formula $$ClCF_2—(CF_2)_n—CF_2Cl$$

wherein $n$ is an integer of at least 1, with a fluorinating agent consisting of $SbF_5$, not more than 10% of $SbF_3$ and chlorofluorides of antimony and not more than 2% of chlorine and heating the mixture in a closed vessel at temperatures of from about 175° C. to about 250° C. until both Cl are replaced by fluorine.

6. The process which comprises mixing $$ClCF_2—CF_2—CF_2Cl$$

with a fluorinating agent consisting of $SbF_5$, not more than 10% of $SbF_3$ and chlorofluorides of antimony and not more than 2% of chlorine and heating the mixture in a closed vessel at temperatures of from about 175° C. to about 350° C. until at least one Cl is replaced by fluorine.

7. The process which comprises mixing an organic compound of the formula $$ClCF_2—(CF_2)_n—CF_3$$

wherein $n$ is an integer of at least 1, with a fluorinating agent consisting of $SbF_5$, not more than 10% of $SbF_3$ and chlorofluorides of antimony and not more than 2% of chlorine and heating the mixture in a closed vessel at temperatures of from about 175° C. to about 250° C. until the Cl is replaced by fluorine.

ANTHONY F. BENNING.
JOSEPH DAL PARK.

REFERENCES CITED

The following references are of record in the file of this patent:

UNITED STATES PATENTS

| Number | Name | Date |
|---|---|---|
| 2,394,581 | Benning et al. | Feb. 12, 1946 |
| 2,413,696 | Downing et al. | Jan. 7, 1947 |
| 2,423,045 | Passino et al. | June 24, 1947 |
| 2,436,357 | Goehenour et al. | Feb. 17, 1948 |

OTHER REFERENCES

Locke et al., "J. Am. Chem. Soc.," vol. 56, pages 1726–1728 (1934).

Henne and Zimmerschied, "Jour. Am. Chem. Soc.," vol. 67, pages 1235–1237 (Aug. 1945).

Henne and Waalkes, "J. Am. Chem. Soc.," vol. 67, pages 1639–1640 (Oct. 1945).